(12) United States Patent
Qin et al.

(10) Patent No.: US 11,057,941 B2
(45) Date of Patent: Jul. 6, 2021

(54) UPLINK ACCESS METHOD, BASE STATION, AND USER EQUIPMENT

(71) Applicant: HUAWEI TECHNOLOGIES CO., LTD., Guangdong (CN)

(72) Inventors: Yi Qin, Kista (SE); Hua Li, Shanghai (CN); Yi Ren, Shenzhen (CN); Zhongfeng Li, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/402,438

(22) Filed: May 3, 2019

(65) Prior Publication Data

US 2019/0261430 A1    Aug. 22, 2019

Related U.S. Application Data

(63) Continuation of application No. PCT/CN2017/108400, filed on Oct. 30, 2017.

(30) Foreign Application Priority Data

Nov. 4, 2016    (CN) .......................... 201610981618.X

(51) Int. Cl.
*H04W 74/08*    (2009.01)
*H04L 5/00*    (2006.01)
(Continued)

(52) U.S. Cl.
CPC .......... *H04W 74/0833* (2013.01); *H04L 5/00* (2013.01); *H04L 5/0016* (2013.01); *H04W 72/02* (2013.01);
(Continued)

(58) Field of Classification Search
None
See application file for complete search history.

(56) References Cited

U.S. PATENT DOCUMENTS

2011/0039499 A1*    2/2011    Zhang ............... H04W 74/0833
                                                        455/67.11
2013/0016705 A1*    1/2013    Zhang .................. H04L 5/0048
                                                        370/336
(Continued)

FOREIGN PATENT DOCUMENTS

CN            101335986 A        12/2008
CN            101400188 A         4/2009
(Continued)

OTHER PUBLICATIONS

Interdigital Communications: "Random access aspects for beambasedNR initial access",3GPP Draft; R1-1610320, Oct. 1, 2016(Oct. 1, 2016), XP051160018,total 6 pages.
(Continued)

*Primary Examiner* — Phirin Sam
*Assistant Examiner* — Faiyazkhan Ghafoerkhan
(74) *Attorney, Agent, or Firm* — Womble Bond Dickinson (US) LLP

(57) ABSTRACT

Embodiments of the present disclosure provide an uplink access method, a base station, and user equipment. The method includes: sending, by a base station, N signals and N pieces of physical random access channel PRACH resource indication information, where N is an integer greater than or equal to 2; and receiving, by the base station, a random access preamble sequence of the user equipment on PRACH resources indicated by the N pieces of PRACH resource indication information. Based on the foregoing solution, a quantity of random access preamble sequences sent by the user equipment is reduced, and uplink access complexity is reduced.

16 Claims, 9 Drawing Sheets

(51) Int. Cl.
*H04W 72/02* (2009.01)
*H04W 72/04* (2009.01)

(52) U.S. Cl.
CPC ......... *H04W 72/04* (2013.01); *H04W 72/046* (2013.01); *H04W 74/08* (2013.01)

(56) References Cited

U.S. PATENT DOCUMENTS

| | | | |
|---|---|---|---|
| 2013/0279412 A1 | 10/2013 | Webb et al. | |
| 2014/0177607 A1 | 6/2014 | Li et al. | |
| 2014/0269532 A1* | 9/2014 | Huang | H04W 74/0833 370/329 |
| 2015/0181461 A1* | 6/2015 | Kim | H04W 28/0289 370/236 |
| 2015/0305014 A1* | 10/2015 | Li | H04W 72/048 370/330 |
| 2015/0359004 A1* | 12/2015 | Xu | H04W 74/0833 370/329 |
| 2017/0006637 A1* | 1/2017 | Sahlin | H04W 74/006 |
| 2017/0257792 A1* | 9/2017 | Kim | H04W 74/08 |
| 2017/0311276 A1* | 10/2017 | Tsai | H04W 56/001 |
| 2018/0098359 A1* | 4/2018 | Patel | H04L 5/0053 |
| 2018/0359790 A1* | 12/2018 | Ingale | H04W 28/16 |
| 2019/0124682 A1* | 4/2019 | Takeda | H04W 74/0833 |
| 2019/0141728 A1* | 5/2019 | Takeda | H04L 27/2692 |
| 2019/0158249 A1* | 5/2019 | Harada | H04W 72/14 |
| 2019/0166619 A1* | 5/2019 | Takeda | H04B 1/7143 |
| 2019/0166627 A1* | 5/2019 | Takeda | H04L 1/18 |
| 2019/0166632 A1* | 5/2019 | Byun | H04W 72/0413 |
| 2019/0200315 A1* | 6/2019 | Tsai | H04B 7/0617 |
| 2020/0280875 A1* | 9/2020 | Kim | H04W 74/0833 |

FOREIGN PATENT DOCUMENTS

| | | |
|---|---|---|
| CN | 103974445 A | 8/2014 |
| CN | 104303429 A | 1/2015 |
| CN | 104956606 A | 9/2015 |
| JP | 2011520366 A | 7/2011 |
| WO | 2010/124228 A2 | 10/2010 |
| WO | 2014/110772 A1 | 7/2014 |

OTHER PUBLICATIONS

Samsung, RACH design with and without beam reciprocity. 3GPP TSG RAN WG1 #86 bis, Lisbon, Portugal, Oct. 10-14, 2016, R1-1609118, 5 pages.

* cited by examiner

UPLINK ACCESS METHOD, BASE STATION, AND USER EQUIPMENT

CROSS-REFERENCE TO RELATED APPLICATIONS

This application is a continuation of International Application No. PCT/CN2017/108400, filed on Oct. 30, 2017, which claims priority to Chinese Patent Application No. 201610981618.X, filed on Nov. 4, 2016. The disclosures of the aforementioned applications are hereby incorporated by reference in their entireties.

TECHNICAL FIELD

Embodiments of the present disclosure relate to communications technologies, and in particular, to an uplink access method, a base station, and user equipment.

BACKGROUND

With development of mobile Internet technologies, a communication capacity requirement is increasingly high, and an existing frequency band resource cannot meet the communication capacity requirement. Therefore, high-frequency communication becomes an important research direction of a fifth generation (5G) mobile communications technology. In the high-frequency communication, to ensure coverage of a wireless signal, a beamforming (BF) technology usually needs to be used. A base station or user equipment may have a plurality of transmit beams or receive beams. During uplink access of the user equipment, the base station or the user equipment may select an optimal receive beam or transmit beam by scanning all receive beams or transmit beams.

When a receive beam and a transmit beam at a base station end are reciprocal and a receive beam and a transmit beam at a user equipment end are reciprocal, there is a specific correspondence between the receive beam and the transmit beam at the base station end and a specific correspondence between the receive beam and the transmit beam at the user equipment end. Multi-beam selection complexity of the uplink access may be reduced based on a receiving status of a downlink channel and a receiving status of a signal. However, this method is applicable only when there is the reciprocity between the receive beam and the transmit beam, and an actual communications system may not meet the reciprocity. Therefore, the method is not universally applicable.

SUMMARY

In view of this, embodiments of the present disclosure provide an uplink access method, a base station, and user equipment, to reduce uplink access complexity.

According to a first aspect, an uplink access method is provided, including:

sending, by a base station, N signals and N pieces of physical random access channel PRACH resource indication information, where N is an integer greater than or equal to 2; and receiving, by the base station, a random access preamble sequence of the user equipment on PRACH resources indicated by the N pieces of PRACH resource indication information.

By using the foregoing solution, the base station may properly configure, based on a status of reciprocity between a receive beam and a transmit beam of the base station, the PRACH resource indicated by the PRACH resource indication information. This reduces a quantity of random access preamble sequences sent by the user equipment and reduces uplink access complexity.

In a first possible implementation of the first aspect, an $i^{th}$ signal and an $i^{th}$ piece of PRACH resource indication information are carried in a transmit beam of the base station, and i is an integer that is greater than or equal to 1 and less than or equal to N.

In a second possible implementation of the first aspect, an $i^{th}$ piece of PRACH resource indication information is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N.

In a third possible implementation of the first aspect, an $i^{th}$ piece of PRACH resource indication information is carried in another channel indicated by channel indication information that is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N.

With reference to the first aspect or the first to the third possible implementations of the first aspect, in a fourth possible implementation, the signal is a reference signal or a synchronization signal.

With reference to the first aspect or the first to the fourth possible implementations of the first aspect, in a fifth possible implementation, the PRACH resource indication information is used to indicate at least two PRACH resources.

With reference to the fifth possible implementation of the first aspect, in a sixth possible implementation, the PRACH resource indication information includes identifiers of the at least two PRACH resources.

With reference to the fifth possible implementation of the first aspect, in a seventh possible implementation, the PRACH resource indication information includes at least one piece of the following indication information of the at least two PRACH resources: time domain resource indication information, frequency domain resource indication information, and code domain resource indication information.

According to a second aspect, an uplink access method is provided, including:

receiving, by user equipment, M signals and M pieces of physical random access channel PRACH resource indication information, where M is an integer greater than or equal to 2; and selecting, by the user equipment, a PRACH resource, and sending a random access preamble sequence by using the PRACH resource.

In a first possible implementation of the second aspect, an $i^{th}$ signal and an $i^{th}$ piece of PRACH resource indication information are carried in a transmit beam of a base station, and i is an integer that is greater than or equal to 1 and less than or equal to N.

In a second possible implementation of the second aspect, an $i^{th}$ piece of PRACH resource indication information is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N.

In a third possible implementation of the second aspect, an $i^{th}$ piece of PRACH resource indication information is carried in another channel indicated by channel indication information that is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N.

With reference to the second aspect or the first to the third possible implementations of the second aspect, in a fourth possible implementation, the signal is a reference signal or a synchronization signal.

With reference to the second aspect or the first to the fourth possible implementations of the second aspect, in a fifth possible implementation, the PRACH resource indication information is used to indicate at least two PRACH resources.

With reference to the fifth possible implementation of the second aspect, in a sixth possible implementation, the PRACH resource indication information includes identifiers of the at least two PRACH resources.

With reference to the fifth possible implementation of the second aspect, in a seventh possible implementation, the PRACH resource indication information includes at least one piece of the following indication information of the at least two PRACH resources: time domain resource indication information, frequency domain resource indication information, and code domain resource indication information.

According to a third aspect, a base station is provided.

The base station includes a sending unit and a receiving unit;

the sending unit is configured to send N signals and N pieces of physical random access channel PRACH resource indication information, where N is an integer greater than or equal to 2; and the receiving unit is configured to receive a random access preamble sequence of the user equipment on PRACH resources indicated by the N pieces of PRACH resource indication information.

In a first possible implementation of the third aspect, an $i^{th}$ signal and an $i^{th}$ piece of PRACH resource indication information are carried in a transmit beam of the sending unit, and i is an integer that is greater than or equal to 1 and less than or equal to N.

According to a fourth aspect, user equipment is provided.

The user equipment includes a receiving unit, a selection unit, and a sending unit;

the receiving unit is configured to receive M signals and M pieces of physical random access channel PRACH resource indication information, where M is an integer greater than or equal to 2;

the selection unit is configured to select a PRACH resource; and the sending unit is configured to send a random access preamble sequence by using the PRACH resource.

In a first possible implementation of the fourth aspect, an $i^{th}$ signal and an $i^{th}$ piece of PRACH resource indication information are carried in a transmit beam of a base station, and i is an integer that is greater than or equal to 1 and less than or equal to N.

According to a fifth aspect, an uplink access method is provided, including:

sending, by a base station, physical random access channel PRACH resource indication information, where the PRACH resource indication information includes a mapping relationship between the PRACH resource and user equipment capability information; and receiving, by the base station, a random access preamble sequence of the user equipment on a PRACH resource indicated by the PRACH resource indication information.

In a first possible implementation of the fifth aspect, the base station determines the user equipment capability information based on the mapping relationship between the PRACH resource used by the user equipment and the user equipment capability information.

With reference to the fifth aspect or the first possible implementation of the fifth aspect, in a second possible implementation, the user equipment capability information is information about reciprocity between a receive beam and a transmit beam of the user equipment or beam correspondence information of the user equipment.

With reference to the foregoing implementations, in a third possible implementation, the user equipment capability information includes whether the user equipment has the reciprocity between a receive beam and a transmit beam or whether the user equipment has a correspondence between a receive beam and a transmit beam; and the reciprocity between a receive beam and a transmit beam or the correspondence between a receive beam and a transmit beam includes at least one of the following: a capability of determining one or more uplink beams based on one or more downlink beams, and a capability of determining one or more downlink beams based on one or more uplink beams.

With reference to the foregoing implementations, in a fourth possible implementation, the user equipment capability further includes at least one of the following: a quantity of uplink beams that is determined by the user equipment based on a downlink beam, and a quantity of downlink beams that is determined by the user equipment based on an uplink beam.

According to a sixth aspect, an uplink access method is provided, including:

receiving, by user equipment, physical random access channel PRACH resource indication information, where the PRACH resource indication information includes a mapping relationship between the PRACH resource and user equipment capability information; and selecting, by the user equipment, a PRACH resource based on the mapping relationship between the PRACH resource and the user equipment capability information, and sending a random access preamble sequence by using the PRACH resource.

In a first possible implementation of the sixth aspect, the user equipment capability information is beam reciprocity information of the user equipment or beam correspondence information of the user equipment.

With reference to the sixth aspect or the first possible implementation of the sixth aspect, in a second possible implementation, the user equipment capability information includes whether the user equipment has reciprocity between a receive beam and a transmit beam or whether the user equipment has a correspondence between a receive beam and a transmit beam; and the reciprocity between a receive beam and a transmit beam or the correspondence between a receive beam and a transmit beam includes at least one of the following: a capability of determining one or more uplink beams based on one or more downlink beams, and a capability of determining one or more downlink beams based on one or more uplink beams.

With reference to the foregoing implementations, in a third possible implementation, the user equipment capability information further includes at least one of the following: a quantity of uplink beams that is determined by the user equipment based on a downlink beam, and a quantity of downlink beams that is determined by the user equipment based on an uplink beam.

According to a seventh aspect, a base station is provided.

The base station includes a sending unit and a receiving unit;

the sending unit is configured to send physical random access channel PRACH resource indication information, where the PRACH resource indication information includes a mapping relationship between the PRACH resource and user equipment capability information; and the receiving unit is configured to receive a random access preamble sequence of the user equipment on a PRACH resource indicated by the PRACH resource indication information.

In a first possible implementation of the seventh aspect, the base station further includes a processing unit, and the processing unit is configured to determine the user equipment capability information based on the mapping relationship between the PRACH resource used by the user equipment and the user equipment capability information.

According to an eighth aspect, user equipment is provided.

The user equipment includes a receiving unit, a selection unit, and a sending unit;

the receiving unit is configured to receive physical random access channel PRACH resource indication information, where the PRACH resource indication information includes a mapping relationship between the PRACH resource and user equipment capability information;

the selection unit is configured to select a PRACH resource based on the mapping relationship between the PRACH resource and the user equipment capability information; and the sending unit is configured to send a random access preamble sequence by using the PRACH resource.

According to a ninth aspect, an information reporting method is provided, including:

receiving, by user equipment, a first signal; and selecting, by the user equipment, a physical random access channel PRACH resource based on a characteristic of the first signal, and sending a random access preamble sequence by using the PRACH resource.

The characteristic of the first signal includes at least one of the following: received signal strength of the first signal, a ranking of the received signal strength of the first signal, a signal to interference plus noise ratio of the first signal, and a ranking of the signal to interference plus noise ratio of the first signal.

In a first possible implementation of the ninth aspect, there is a mapping relationship between the characteristic of the first signal and the PRACH resource.

With reference to the first possible implementation of the ninth aspect, in a second possible implementation, the mapping relationship is sent by the base station to the user equipment or is preset.

According to a tenth aspect, an information reporting method is provided, including:

sending, by a base station, a first signal to user equipment; and receiving, by the base station, a random access preamble sequence that is sent on a physical random access channel PRACH resource selected by the user equipment based on a characteristic of the first signal.

In a first possible implementation of the tenth aspect, the method further includes:

determining, by the base station, the characteristic of the first signal based on the PRACH resource.

The characteristic of the first signal includes at least one of the following: received signal strength of the first signal, a ranking of the received signal strength of the first signal, a signal to interference plus noise ratio of the first signal, and a ranking of the signal to interference plus noise ratio of the first signal.

With reference to the foregoing implementations, in a second possible implementation, there is a mapping relationship between the characteristic of the first signal and the PRACH resource.

With reference to the second possible implementation of the tenth aspect, in a third possible implementation, the mapping relationship is sent by the base station to the user equipment or is preset.

According to an eleventh aspect, a base station is provided.

The base station includes a sending unit and a receiving unit;

the sending unit is configured to send a first signal to user equipment; and the receiving unit is configured to receive a random access preamble sequence that is sent on a physical random access channel PRACH resource selected by the user equipment based on a characteristic of the first signal.

In a first possible implementation of the eleventh aspect, the base station further includes a processing unit, and the processing unit is configured to determine the characteristic of the first signal based on the PRACH resource.

The characteristic of the first signal includes at least one of the following: received signal strength of the first signal, a ranking of the received signal strength of the first signal, a signal to interference plus noise ratio of the first signal, and a ranking of the signal to interference plus noise ratio of the first signal.

According to a twelfth aspect, user equipment is provided. The user equipment includes a receiving unit, a selection unit, and a sending unit;

the receiving unit is configured to receive a first signal;

the selection unit is configured to select a physical random access channel PRACH resource based on a characteristic of the first signal; and the sending unit is configured to send a random access preamble sequence by using the PRACH resource.

According to a thirteenth aspect, an uplink information sending method is provided, including:

sending, by user equipment, the first k random access preamble sequences, where the user equipment has a total of X to-be-sent random access preamble sequences, X is an integer greater than or equal to 2, and k is an integer that is greater than or equal to 1 and less than or equal to X; and if the user equipment receives a random access response, stopping sending the random access preamble sequence; or if the user equipment does not receive a random access response, and does not send all the X random access preamble sequences, continuing to send a remaining random access preamble sequence.

According to a fourteenth aspect, user equipment is provided.

The user equipment includes a sending unit, a receiving unit, and a processing unit;

the sending unit is configured to send the first k random access preamble sequences, where the user equipment has a total of X to-be-sent random access preamble sequences, X is an integer greater than or equal to 2, and k is an integer that is greater than or equal to 1 and less than or equal to X;

the receiving unit is configured to receive a random access response; and the processing unit is configured to: after the receiving unit receives the random access response, control the sending unit to stop sending the random access preamble sequence, where the processing unit is further configured to: when the receiving unit does not receive the random access response, and the sending unit does not send all the X random access preamble sequences, control the sending unit to continue to send a remaining random access preamble sequence.

According to a fifteenth aspect, an uplink information sending method is provided, including:

sending, by a base station to user equipment, a mapping relationship between a physical random access channel PRACH resource and a quantity of remaining to-be-sent random access preamble sequences of the user equipment; and receiving, by the base station, a random access preamble sequence sent by the user equipment, and determining, based on a PRACH resource used by the random access preamble sequence, a remaining to-be-sent random access preamble sequence of the user equipment.

In a first possible implementation of the fifteenth aspect, the method further includes:

sending, by the base station to the user equipment, a maximum quantity of to-be-sent random access preamble sequences.

In a second possible implementation of the fifteenth aspect, a maximum quantity of to-be-sent random access preamble sequences sent by the user equipment is preset.

According to a sixteenth aspect, an uplink information sending method is provided, including:

receiving, by user equipment, a mapping relationship between a physical random access channel PRACH resource and a quantity of remaining to-be-sent random access preamble sequences of the user equipment; and selecting, by the user equipment, a PRACH resource based on the mapping relationship between the physical random access channel PRACH resource and the quantity of remaining to-be-sent random access preamble sequences of the user equipment, and sending a random access preamble sequence.

In a first possible implementation of the sixteenth aspect, the method further includes:

receiving, by the user equipment, a maximum quantity of to-be-sent random access preamble sequences.

In a second possible implementation of the sixteenth aspect, a maximum quantity of to-be-sent random access preamble sequences sent by the user equipment is preset.

According to a seventeenth aspect, a base station is provided.

The base station includes a sending unit, a receiving unit, and a processing unit;

the sending unit is configured to send, to user equipment, a mapping relationship between a physical random access channel PRACH resource and a quantity of remaining to-be-sent random access preamble sequences of the user equipment;

the receiving unit is configured to receive a random access preamble sequence sent by the user equipment; and the processing unit is configured to determine, based on a PRACH resource used by the random access preamble sequence, a remaining to-be-sent random access preamble sequence of the user equipment.

In a first possible implementation of the seventeenth aspect, the sending unit is further configured to send a maximum quantity of to-be-sent random access preamble sequences to the user equipment.

According to an eighteenth aspect, user equipment is provided.

The user equipment includes a receiving unit, a processing unit, and a sending unit;

the receiving unit is configured to receive a mapping relationship between a physical random access channel PRACH resource and a quantity of remaining to-be-sent random access preamble sequences of the user equipment;

the processing unit is configured to select a PRACH resource based on the mapping relationship; and the sending unit is configured to send a random access preamble sequence.

In a first possible implementation of the eighteenth aspect, the receiving unit is further configured to receive a maximum quantity of to-be-sent random access preamble sequences.

DESCRIPTION OF EMBODIMENTS

Embodiment 1

Figure 1:
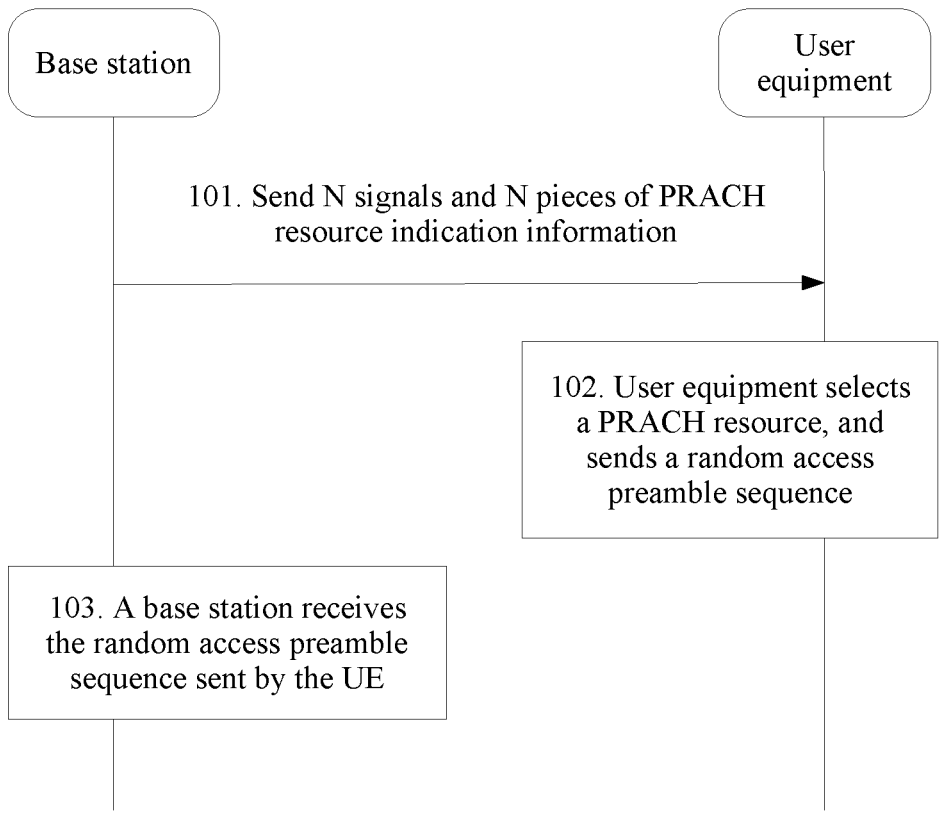
FIG. 1 is a flowchart of an uplink access method according to Embodiment 1 of the present disclosure.

FIG. 1 is a flowchart of an uplink access method according to an embodiment of the present disclosure. The method includes the following operations.

Operation 101: A base station sends N signals and N pieces of physical random access channel (PRACH) resource indication information, where N is an integer greater than or equal to 2.

Optionally, in this embodiment of the present disclosure, the base station may send the N signals and the N pieces of PRACH resource indication information through N transmit beams. Each transmit beam carries one signal and one piece of PRACH resource indication information.

In one embodiment, an $i^{th}$ piece of PRACH resource indication information in the N pieces of PRACH resource indication information is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N.

It should be noted that i in that an $i^{th}$ piece of PRACH resource indication information is carried in an $i^{th}$ channel herein is only used to indicate that one piece of PRACH resource indication information corresponds to one channel, and is not a strict sequence relationship.

Alternatively, an $i^{th}$ piece of PRACH resource indication information is carried in another channel indicated by channel indication information that is carried in an $i^{th}$ channel, and a time-frequency-code resource used by an $i^{th}$ signal has a preset relationship with a time-frequency-code resource used by the $i^{th}$ channel. In one embodiment, the $i^{th}$ channel may be a broadcast channel of an $i^{th}$ transmit beam. The another channel may be a downlink shared channel or another downlink channel, and may be used to transmit a system message.

In one embodiment, the signal is a synchronization signal or a reference signal.

In one embodiment, the PRACH resource indication information may be carried in a broadcast message.

Operation 102: User equipment selects a PRACH resource based on the N signals and the N pieces of PRACH resource indication information, and sends a random access preamble sequence by using the PRACH resource.

In one embodiment, the user equipment may measure signal strength based on the received signals, select one signal or at least two signals with optimal signal strength, and determine an uplink PRACH resource based on PRACH resource indication information corresponding to a selected signal. The user equipment may receive only some of the foregoing N signals.

In this embodiment of the present disclosure, the signal strength may be a reference signal received power (RSRP), a signal to interference plus noise ratio (SINR), or the like.

Operation 103: The base station receives, on PRACH resources indicated by the N pieces of PRACH resource indication information, the random access preamble sequence sent by the user equipment.

It should be noted that the base station can successfully receive the random access preamble sequence only on the PRACH resource selected by the user equipment.

In this embodiment of the present disclosure, a PRACH channel is used to transmit a preamble sequence during uplink access, and may have another name.

In this embodiment of the present disclosure, the base station may properly configure, based on a status of reciprocity between a receive beam and a transmit beam of the base station, the PRACH resource indicated by the PRACH resource indication information. This reduces a quantity of random access preamble sequences sent by the user equipment and reduces uplink access complexity.

For example, if a transmit beam A of the base station corresponds to a receive beam a of the base station, PRACH resource indication information carried in the transmit beam A is used to indicate a PRACH resource corresponding to the receive beam a. If a transmit beam A of the base station has a good correspondence with receive beams b and c of the base station, PRACH resource indication information carried in the transmit beam A is used to indicate PRACH resources corresponding to the receive beams b and c.

Optionally, in this embodiment of the present disclosure, the PRACH resource indication information may include information about reciprocity between a receive beam and a transmit beam of the base station, for example, reciprocity between a receive beam and a transmit beam of the base station, partial reciprocity between a receive beam and a transmit beam of the base station, and non-reciprocity between a receive beam and a transmit beam of the base station. After receiving the PRACH resource indication information, the user equipment determines an available PRACH resource based on corresponding reciprocity information. For example, when a receive beam and a transmit beam of the base station are reciprocal, a PRACH resource of the receive beam corresponding to the transmit beam of the base station is used. When a receive beam and a transmit beam of the base station are non-reciprocal, all or some uplink available PRACH resources are used. In one embodiment, the PRACH resource indication information may further include an identifier of the PRACH resource or at least one piece of the following indication information of the PRACH resource: time domain resource indication information, frequency domain resource indication information, and code domain resource indication information.

Figure 2:
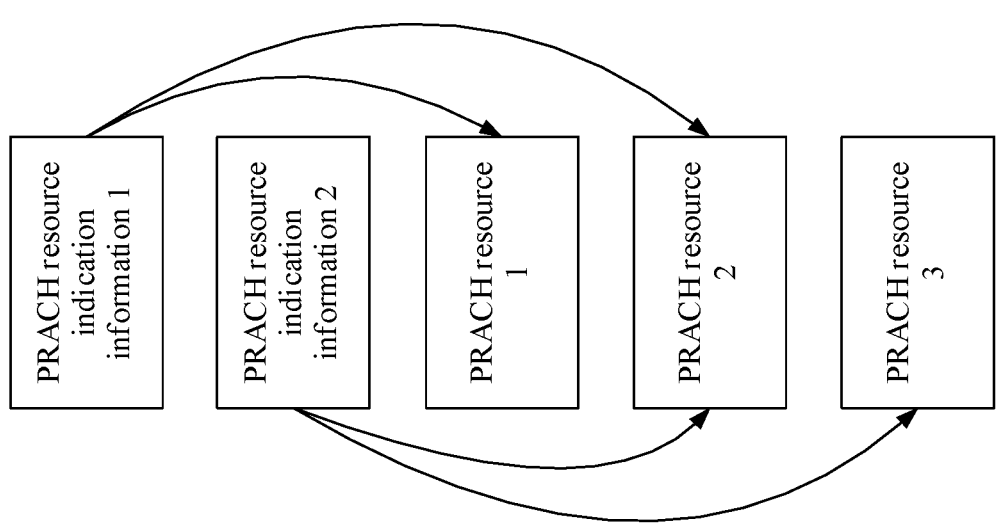
FIG. 2 is a schematic diagram of a PRACH resource indication according to Embodiment 1 of the present disclosure.

In one embodiment, one piece of PRACH resource indication information may indicate at least two PRACH resources. The user equipment may send the random access preamble sequence by using the at least two PRACH resources. As shown in FIG. 2, PRACH resource indication information 1 indicates a PRACH resource 1 and a PRACH resource 2, and PRACH resource indication information 2 indicates the PRACH resource 2 and a PRACH resource 3. PRACH resources indicated by different pieces of PRACH resource indication information may be independent of each other, or may partially overlap.

In the foregoing indication manner, one transmit beam of the base station corresponds to at least two PRACH resources. The foregoing indication manner may be applied to a scenario of the partial reciprocity between a receive beam and a transmit beam of the base station.

This embodiment of the present disclosure further provides an apparatus embodiment for implementing operations and methods in the method embodiment. It should be noted that specific solution details related to the method or a particular operation are also applicable in the apparatus embodiment. Therefore, the details are not described again in the apparatus embodiment. For the details, refer to the corresponding method embodiment.

Figure 3:
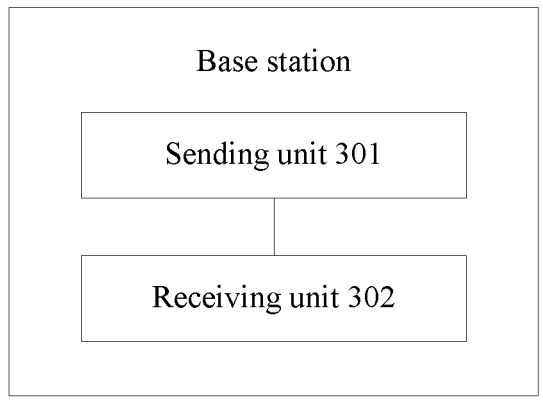
FIG. 3 is a structural block diagram of a base station according to Embodiment 1 of the present disclosure.

This embodiment of the present disclosure provides a base station. As shown in FIG. 3, the base station includes a sending unit 301 and a receiving unit 302.

The sending unit is configured to send N signals and N pieces of physical random access channel PRACH resource indication information, where N is an integer greater than or equal to 2.

The receiving unit is configured to receive a random access preamble sequence of the user equipment on PRACH resources indicated by the N pieces of PRACH resource indication information.

In one embodiment, an $i^{th}$ signal and an $i^{th}$ piece of PRACH resource indication information are carried in a transmit beam of the sending unit, and i is an integer that is greater than or equal to 1 and less than or equal to N.

Figure 4:
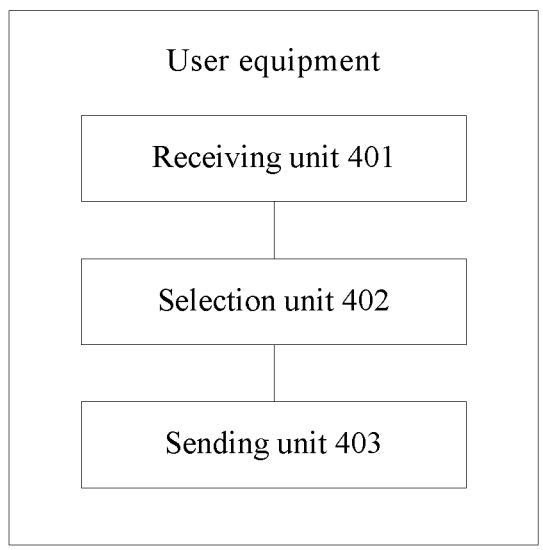
FIG. 4 is a structural block diagram of user equipment according to Embodiment 1 of the present disclosure.

This embodiment of the present disclosure provides user equipment. As shown in FIG. 4, the user equipment includes a receiving unit 401, a selection unit 402, and a sending unit 403.

The receiving unit is configured to receive M signals and M pieces of physical random access channel PRACH resource indication information, where M is an integer greater than or equal to 2.

The selection unit is configured to select a PRACH resource.

The sending unit is configured to send a random access preamble sequence by using the PRACH resource.

In one embodiment, an $i^{th}$ signal and an $i^{th}$ piece of PRACH resource indication information are carried in a transmit beam of a base station, and i is an integer that is greater than or equal to 1 and less than or equal to N.

It should be noted that the foregoing apparatus embodiment may be alternatively implemented by using a software and hardware platform that includes a processor, a transmitter, and a receiver, and may further include a component such as a memory, or may be implemented by using a software platform.

Embodiment 2

Figure 5:
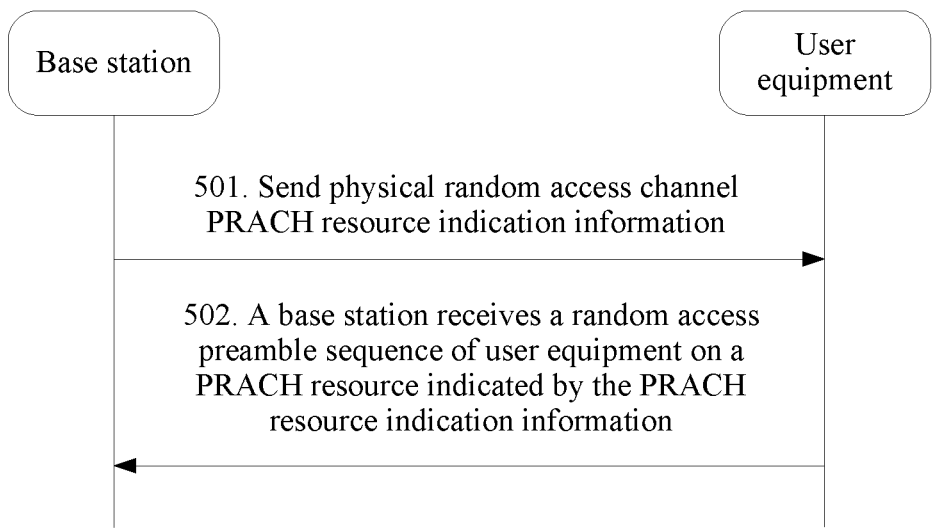
FIG. 5 is a flowchart of an uplink access method according to Embodiment 2 of the present disclosure.

As shown in FIG. 5, an embodiment of the present disclosure provides another uplink access method, including the following operations:

Operation 501: A base station sends physical random access channel PRACH resource indication information, where the PRACH resource indication information includes a mapping relationship between the PRACH resource and user equipment capability information.

Operation 502: The base station receives a random access preamble sequence of the user equipment on a PRACH resource indicated by the PRACH resource indication information.

In this embodiment of the present disclosure, the user equipment selects a corresponding PRACH resource based on the user equipment capability information.

The method may further include: The base station determines the user equipment capability information based on the mapping relationship between the PRACH resource used by the user equipment and the user equipment capability information.

The user equipment capability information is information about reciprocity between a receive beam and a transmit beam of the user equipment or beam correspondence information of the user equipment.

In one embodiment, the user equipment capability information includes whether the user equipment has the reciprocity between a receive beam and a transmit beam or whether the user equipment has a correspondence between a receive beam and a transmit beam.

The reciprocity between a receive beam and a transmit beam includes at least one of the following: a capability of determining one or more uplink beams based on one or more downlink beams, and a capability of determining one or more downlink beams based on one or more uplink beams. Specifically, a strength ranking of an uplink beam may be determined based on a strength ranking of a downlink beam. Space information of an uplink beam, for example, an angle of departure (AOD), is determined based on space information of a downlink beam, for example, an angle of arrival (AOA).

In one embodiment, the information about the reciprocity between a receive beam and a transmit beam of the user equipment further includes at least one of the following: a quantity of uplink beams that is determined by the user equipment based on a downlink beam, and a quantity of downlink beams that is determined by the user equipment based on an uplink beam.

Figure 6:
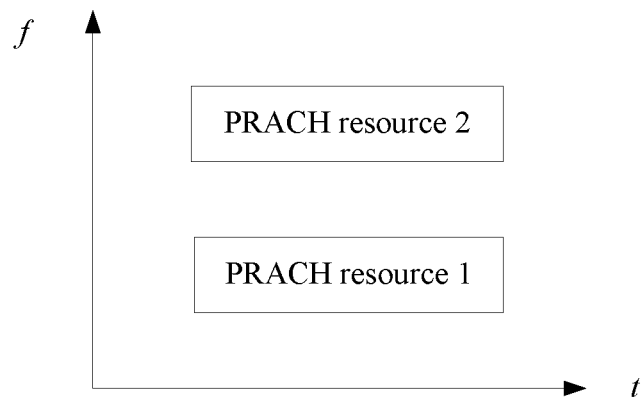
FIG. 6 is a schematic diagram of a PRACH resource according to Embodiment 2 of the present disclosure.

Optionally, in this embodiment of the present disclosure, each piece of PRACH resource indication information may indicate at least two PRACH resources. When selecting a PRACH resource, the user equipment may select different PRACH resources based on the information about the reciprocity between a receive beam and a transmit beam of the user equipment. For example, as shown in FIG. 6, the PRACH resource indication information indicates a PRACH resource 1 or a PRACH resource 2. There is a mapping relationship between each PRACH resource and user equipment reciprocity information. For example, FIG. 6 shows a relationship between the information about the reciprocity between a receive beam and a transmit beam of the user and the PRACH resource. For example, that the user has the reciprocity between a receive beam and a transmit beam corresponds to the PRACH resource 1, and that the user does not have the reciprocity between a receive beam and a transmit beam corresponds to the PRACH resource 2. The user selects the PRACH resource based on the information about the reciprocity between a receive beam and a transmit beam of the user, and sends a physical layer random access preamble sequence on the selected PRACH resource. The base station receives a PRACH and detects the physical layer random access preamble sequence, to determine the PRACH resource used by the user. The base station determines beam reciprocity information of the user equipment based on the PRACH resource used by the user equipment and a mapping relationship between the PRACH resource used by the user equipment and the reciprocity between a receive beam and a transmit beam of the user equipment. The mapping relationship between the PRACH resource and the information about the reciprocity between a receive beam and a transmit beam of the user equipment may be sent by the base station to the user equipment or preset.

This embodiment of the present disclosure further provides an apparatus embodiment for implementing operations and methods in the method embodiment. It should be noted that specific solution details related to the method or a particular operation are also applicable in the apparatus embodiment. Therefore, the details are not described again in the apparatus embodiment. For the details, refer to the corresponding method embodiment.

Figure 7:
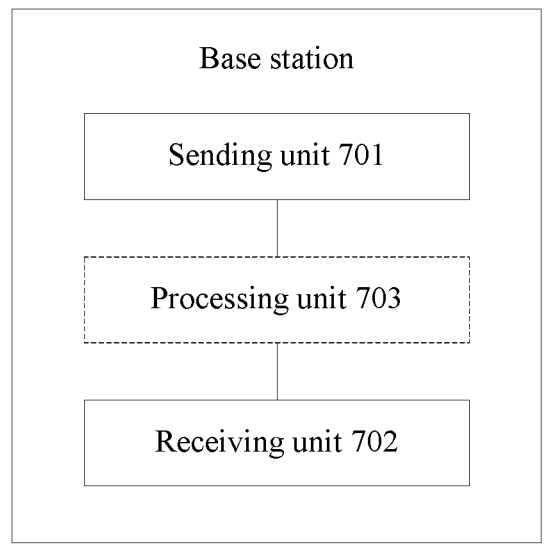
FIG. 7 is a structural block diagram of a base station according to Embodiment 2 of the present disclosure.

This embodiment of the present disclosure provides a base station. As shown in FIG. 7, the base station includes a sending unit 701 and a receiving unit 702.

The sending unit is configured to send physical random access channel PRACH resource indication information, where the PRACH resource indication information includes a mapping relationship between the PRACH resource and user equipment capability information.

The receiving unit is configured to receive a random access preamble sequence of the user equipment on a PRACH resource indicated by the PRACH resource indication information.

In one embodiment, the base station further includes a processing unit 703.

The processing unit is configured to determine the user equipment capability information based on the mapping relationship between the PRACH resource used by the user equipment and the user equipment capability information.

Figure 8:
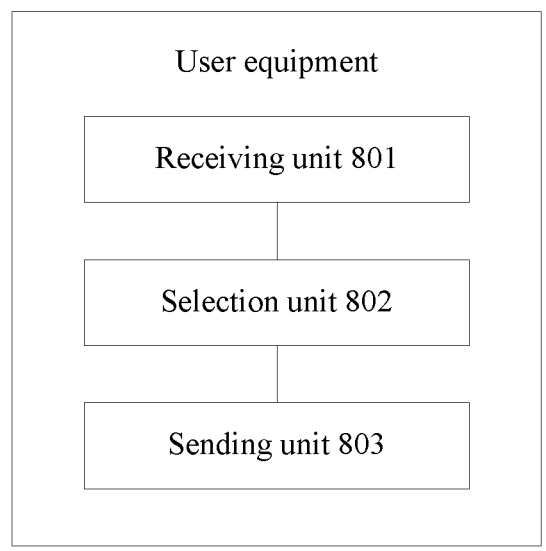
FIG. 8 is a structural block diagram of user equipment according to Embodiment 2 of the present disclosure.

This embodiment of the present disclosure provides user equipment. As shown in FIG. 8, the user equipment includes a receiving unit 801, a selection unit 802, and a sending unit 803.

The receiving unit is configured to receive physical random access channel PRACH resource indication information, where the PRACH resource indication information includes a mapping relationship between the PRACH resource and user equipment capability information.

The selection unit is configured to select a PRACH resource based on the mapping relationship between the PRACH resource and the user equipment capability information.

The sending unit is configured to send a random access preamble sequence by using the PRACH resource.

It should be noted that the foregoing apparatus embodiment may be alternatively implemented by using a software and hardware platform that includes a processor, a transmitter, and a receiver, and may further include a component such as a memory, or may be implemented by using a software platform.

Embodiment 3

Figure 9:
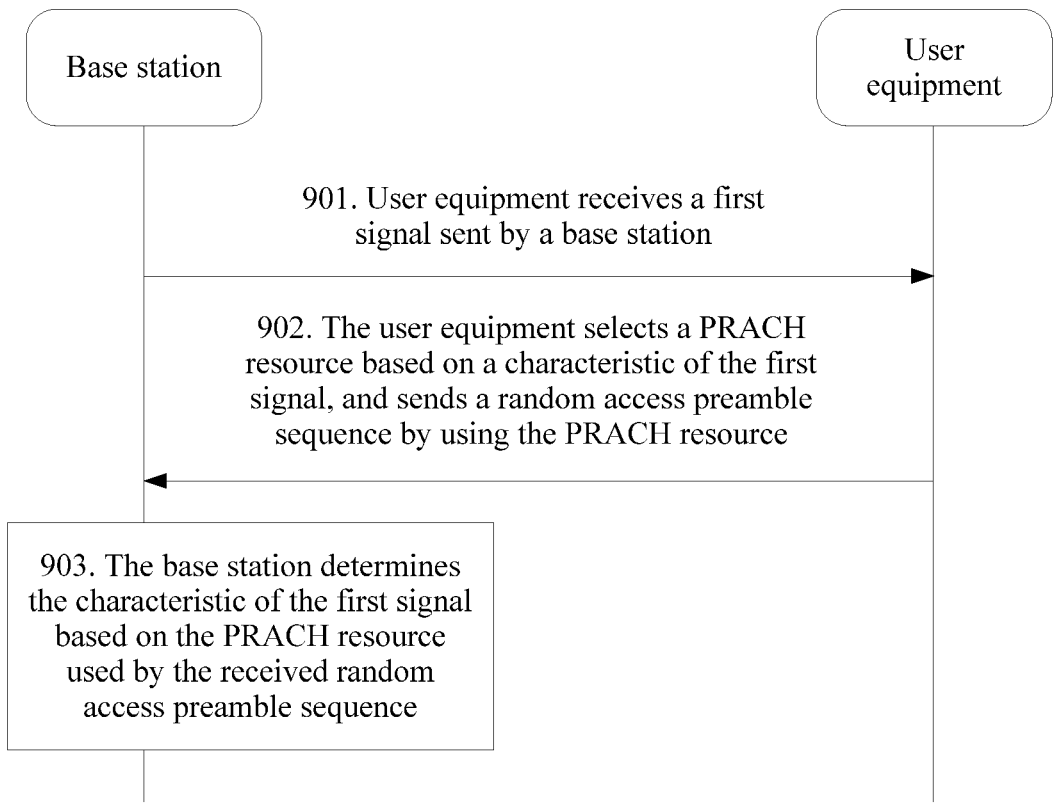
FIG. 9 is a flowchart of an information reporting method according to Embodiment 3 of the present disclosure.

As shown in FIG. 9, another embodiment of the present disclosure provides an information reporting method, including the following operations.

Operation 901: User equipment receives a first signal sent by a base station.

Operation 902: The user equipment selects a PRACH resource based on a characteristic of the first signal, and sends a random access preamble sequence by using the PRACH resource.

In one embodiment, the characteristic of the first signal includes at least one of the following: received signal strength of the first signal, a ranking of the received signal strength of the first signal, a signal to interference plus noise ratio of the first signal, and a ranking of the signal to interference plus noise ratio of the first signal.

In one embodiment, the user equipment may receive M transmit beams sent by the base station. Each beam carries one signal and corresponding uplink PRACH resource indication information. Each piece of PRACH resource indication information indicates at least two PRACH resources. The user equipment measures the M signals to obtain signal strength rankings.

In this embodiment of the present disclosure, signal strength may be an RSRP, an SINR, or the like.

In one embodiment, the user equipment selects at least one signal from the M signals, determines at least two PRACH resources corresponding to each signal, and selects, for each signal based on a signal strength ranking, one PRACH resource for sending the random access preamble sequence. There is a mapping relationship between a signal strength ranking and a PRACH resource.

Operation 903: The base station determines the characteristic of the first signal based on the PRACH resource used by the received random access preamble sequence.

Optionally, in this embodiment of the present disclosure, the user equipment may select two optimal beams, and strength or quality of the selected beams is required to be greater than a particular threshold. If only one beam meets the foregoing condition, the only one beam is fed back.

In one embodiment, a mapping relationship between a signal characteristic and a PRACH resource is sent by the base station to the user equipment or is preset.

Figure 10:
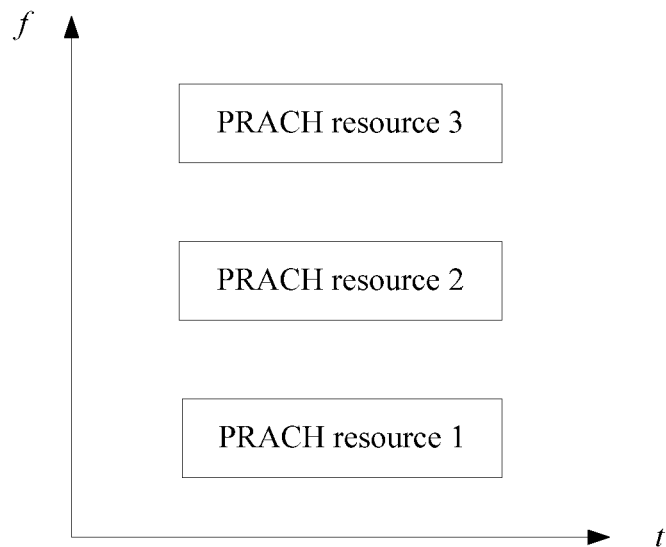
FIG. 10 is a schematic diagram of a PRACH resource according to Embodiment 3 of the present disclosure.

For example, as shown in FIG. 10, a beam A carries a signal 1, a beam B carries a signal 2, and a beam C carries a signal 3. The base station sends the PRACH resource indication information. The PRACH indication information indicates a PRACH resource 1, a PRACH resource 2, and a PRACH resource 3. The mapping relationship between a signal strength ranking and a PRACH resource is as follows: Signal strength rankings of the signal 1 that correspond to the PRACH resource 1, the PRACH resource 2, and the PRACH resource 3 are 1, 2, and 3 respectively.

If the signal strength ranking of the signal 1 is measured as 1, the PRACH resource 1 is used. If the signal strength ranking of the signal 1 is measured as 2, the PRACH resource 2 is used. If the signal strength ranking of the signal 1 is measured as 3, the PRACH resource 3 is used. The base station may determine a signal strength ranking of a corresponding signal based on the PRACH resource used by the user equipment and the mapping relationship.

It should be noted that, for a specific manner in which the base station sends the signal and the PRACH resource indication information and a specific manner in which the user equipment selects the PRACH resource corresponding to the at least one signal in this embodiment of the present disclosure, refer to manners in the foregoing uplink access method embodiment.

In this embodiment of the present disclosure, the user equipment selects the PRACH resource based on a ranking of downlink received signal strength, and the base station may determine the ranking of the downlink received signal strength based on the PRACH resource used by the user equipment.

This embodiment of the present disclosure further provides an apparatus embodiment for implementing operations and methods in the method embodiment. It should be noted that specific solution details related to the method or a particular operation are also applicable in the apparatus embodiment. Therefore, the details are not described again in the apparatus embodiment. For the details, refer to the corresponding method embodiment.

Figure 11:
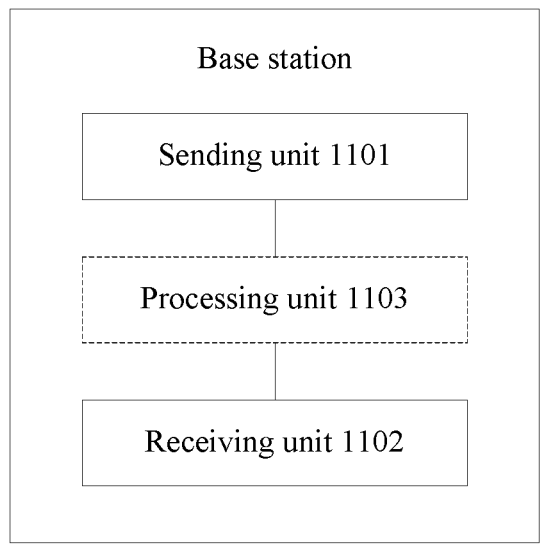
FIG. 11 is a structural block diagram of a base station according to Embodiment 3 of the present disclosure.

This embodiment of the present disclosure provides a base station. As shown in FIG. 11, the base station includes a sending unit 1101 and a receiving unit 1102.

The sending unit is configured to send a first signal to user equipment.

The receiving unit is configured to receive a random access preamble sequence that is sent on a physical random access channel PRACH resource selected by the user equipment based on a characteristic of the first signal.

In one embodiment, the base station further includes a processing unit 1103, configured to determine the characteristic of the first signal based on the PRACH resource.

The characteristic of the first signal includes at least one of the following: received signal strength of the first signal, a ranking of the received signal strength of the first signal, a signal to interference plus noise ratio of the first signal, and a ranking of the signal to interference plus noise ratio of the first signal.

Figure 12:
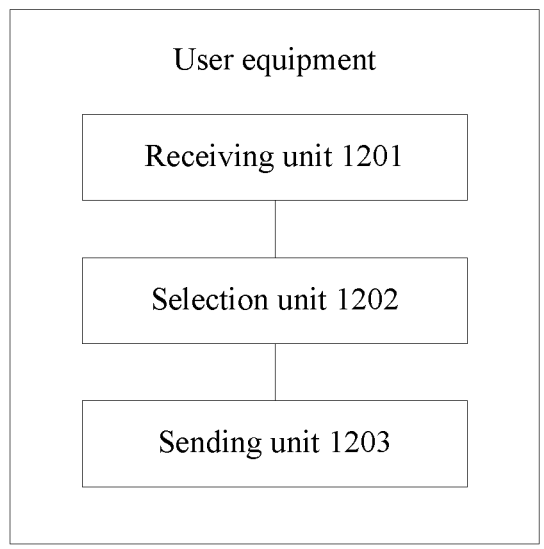
FIG. 12 is a structural block diagram of user equipment according to Embodiment 3 of the present disclosure.

This embodiment of the present disclosure provides user equipment. As shown in FIG. 12, the user equipment includes a receiving unit 1201, a selection unit 1202, and a sending unit 1203.

The receiving unit is configured to receive a first signal.

The selection unit is configured to select a physical random access channel PRACH resource based on a characteristic of the first signal.

The sending unit is configured to send a random access preamble sequence by using the PRACH resource.

It should be noted that the foregoing apparatus embodiment may be alternatively implemented by using a software and hardware platform that includes a processor, a transmitter, and a receiver, and may further include a component such as a memory, or may be implemented by using a software platform.

Embodiment 4

Figure 13:
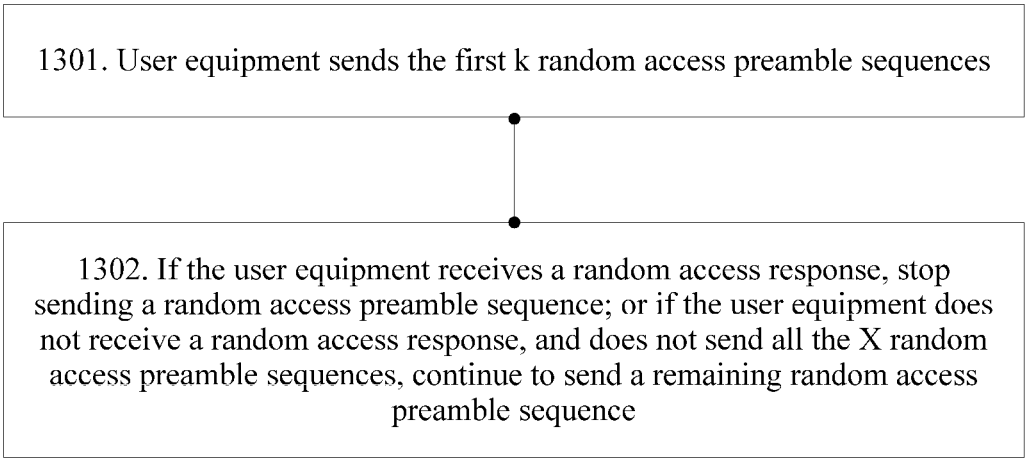
FIG. 13 is a flowchart of an uplink information sending method according to Embodiment 4 of the present disclosure.

As shown in FIG. 13, another embodiment of the present disclosure provides an uplink information sending method, including the following operations.

Operation 1301: User equipment sends the first k random access preamble sequences, where the user equipment has a total of X to-be-sent random access preamble sequences, X is an integer greater than or equal to 2, and k is an integer that is greater than or equal to 1 and less than or equal to X.

Optionally, in this embodiment of the present disclosure, the X to-be-sent random access preamble sequences may be different or may be the same, and are sent by using different time-frequency resources.

Operation 1302: If the user equipment receives a random access response, stop sending a random access preamble sequence; or if the user equipment does not receive a random access response, and does not send all the X random access preamble sequences, continue to send a remaining random access preamble sequence.

In this embodiment of the present disclosure, the user equipment has X beams or resources that may be used to send the random access preamble sequences, and does not perform a backoff backoff operation when the user equipment does not send all random access preamble sequences and does not receive the random access response. When receiving the random access response, the user equipment stops sending the random access preamble sequence.

This embodiment of the present disclosure further provides an apparatus embodiment for implementing operations and methods in the method embodiment. It should be noted that specific solution details related to the method or a particular operation are also applicable in the apparatus embodiment. Therefore, the details are not described again in the apparatus embodiment. For the details, refer to the corresponding method embodiment.

Figure 14:
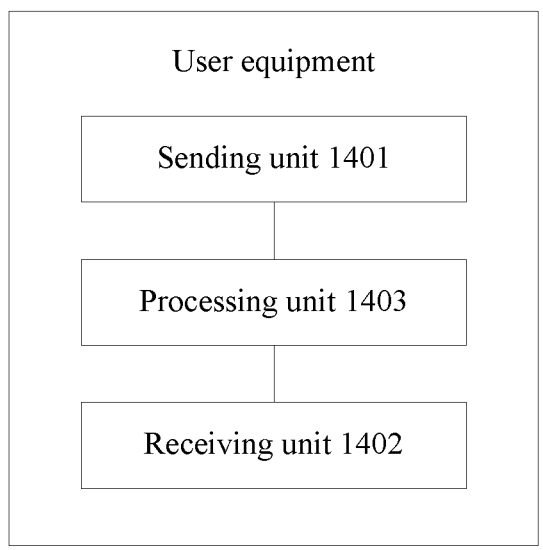
FIG. 14 is a structural block diagram of user equipment according to Embodiment 4 of the present disclosure.

This embodiment of the present disclosure provides user equipment. As shown in FIG. 14, the user equipment includes a sending unit 1401, a receiving unit 1402, and a processing unit 1403.

The sending unit is configured to send the first k random access preamble sequences, where the user equipment has a total of X to-be-sent random access preamble sequences, X is an integer greater than or equal to 2, and k is an integer that is greater than or equal to 1 and less than or equal to X.

The receiving unit is configured to receive a random access response.

The processing unit is configured to: after the receiving unit receives the random access response, control the sending unit to stop sending the random access preamble sequence.

The processing unit is further configured to: when the receiving unit does not receive the random access response, and the sending unit does not send all the X random access preamble sequences, control the sending unit to continue to send a remaining random access preamble sequence.

It should be noted that the foregoing apparatus embodiment may be alternatively implemented by using a software and hardware platform that includes a processor, a transmitter, and a receiver, and may further include a component such as a memory, or may be implemented by using a software platform.

Embodiment 5

Figure 15:
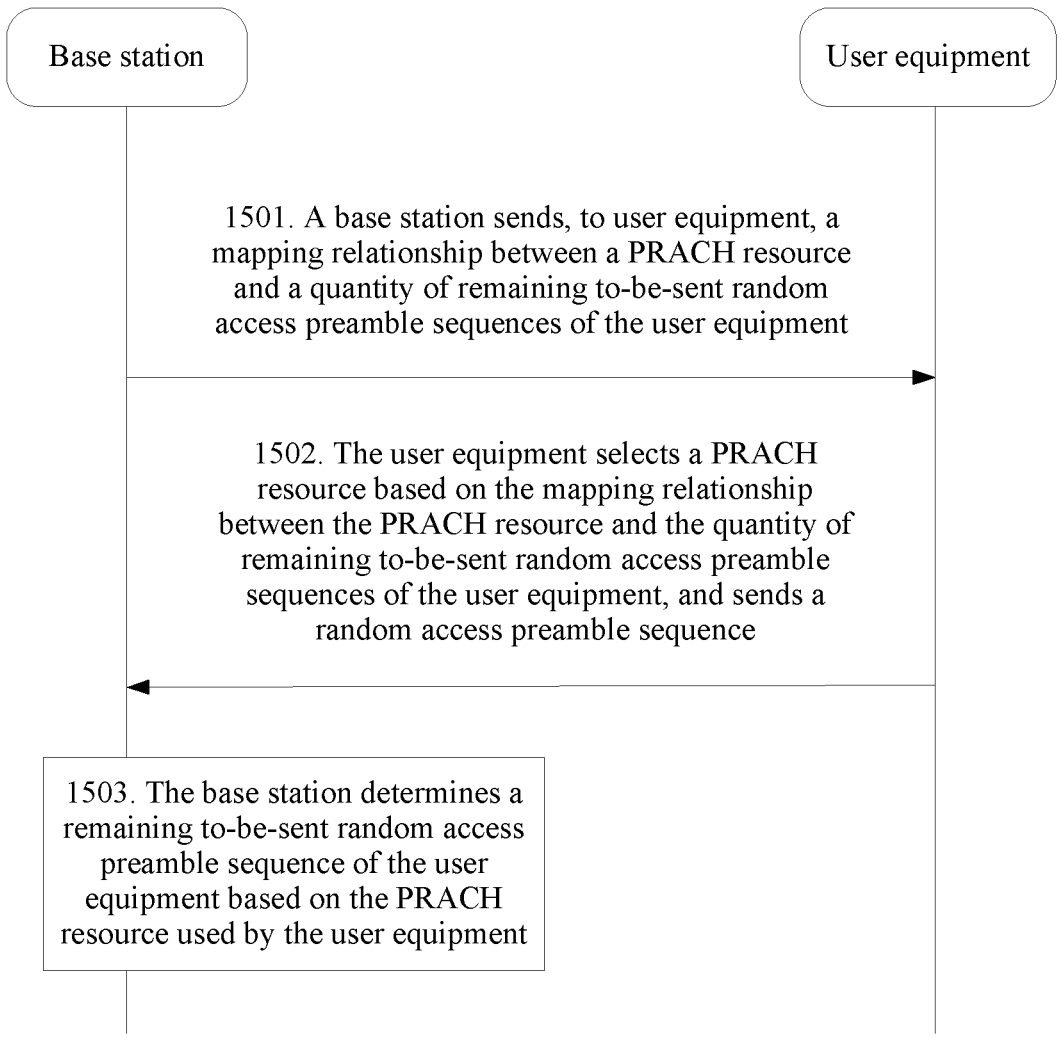
FIG. 15 is a flowchart of an uplink information sending method according to Embodiment 5 of the present disclosure.

As shown in FIG. 15, an embodiment of the present disclosure provides another uplink information sending method, including the following operations.

Operation 1501: A base station sends, to user equipment, a mapping relationship between a PRACH resource and a quantity of remaining to-be-sent random access preamble sequences of the user equipment.

Optionally, in this embodiment of the present disclosure, a plurality of random access preamble sequences may be different or may be the same, and are sent by using different time-frequency resources.

In one embodiment, the base station may send a maximum quantity of to-be-sent random access preamble sequences to the user equipment, or a maximum quantity of random access preamble sequences that can be sent may be preset.

Operation 1502: The user equipment selects a PRACH resource based on the mapping relationship between the PRACH resource and the quantity of remaining to-be-sent random access preamble sequences of the user equipment, and sends a random access preamble sequence.

Operation 1503: The base station determines a remaining to-be-sent random access preamble sequence of the user equipment based on the PRACH resource used by the user equipment.

In this embodiment of the present disclosure, operation 1501 is optional. The mapping relationship between the PRACH resource and the quantity of remaining to-be-sent random access preamble sequences of the user equipment may be preset, and does not need to be sent by the base station.

Optionally, in this embodiment of the present disclosure, each random access preamble sequence may correspond to one transmit beam of the user equipment.

This embodiment of the present disclosure further provides an apparatus embodiment for implementing operations and methods in the method embodiment. It should be noted that specific solution details related to the method or a particular operation are also applicable in the apparatus embodiment. Therefore, the details are not described again in the apparatus embodiment. For the details, refer to the corresponding method embodiment.

Figure 16:
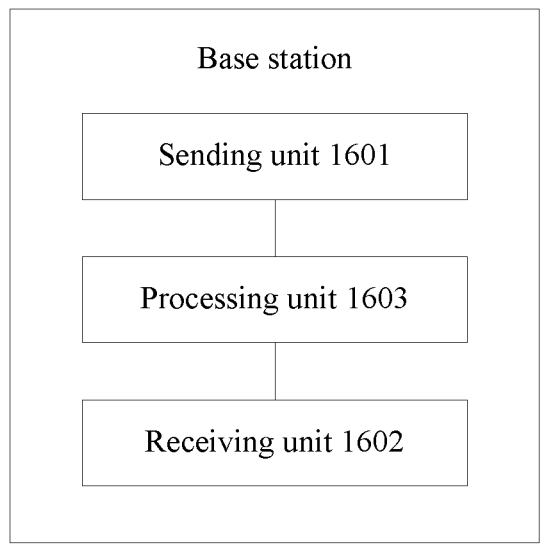
FIG. 16 is a structural block diagram of a base station according to Embodiment 5 of the present disclosure.

This embodiment of the present disclosure provides a base station. As shown in FIG. 16, the base station includes a sending unit 1601, a receiving unit 1602, and a processing unit 1603.

The sending unit is configured to send, to user equipment, a mapping relationship between a physical random access channel PRACH resource and a quantity of remaining to-be-sent random access preamble sequences of the user equipment.

The receiving unit is configured to receive a random access preamble sequence sent by the user equipment.

The processing unit is configured to determine, based on a PRACH resource used by the random access preamble sequence, a remaining to-be-sent random access preamble sequence of the user equipment.

In one embodiment, the sending unit is further configured to send a maximum quantity of to-be-sent random access preamble sequences to the user equipment.

Figure 17:
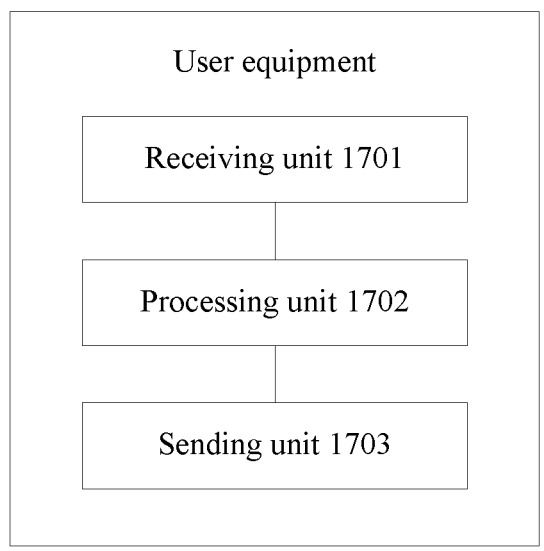
FIG. 17 is a structural block diagram of user equipment according to Embodiment 5 of the present disclosure.

This embodiment of the present disclosure provides user equipment. As shown in FIG. 17, the user equipment includes a receiving unit 1701, a processing unit 1702, and a sending unit 1703.

The receiving unit is configured to receive a mapping relationship between a physical random access channel PRACH resource and a quantity of remaining to-be-sent random access preamble sequences of the user equipment.

The processing unit is configured to select a PRACH resource based on the mapping relationship.

The sending unit is configured to send a random access preamble sequence.

In one embodiment, the receiving unit is further configured to receive a maximum quantity of to-be-sent random access preamble sequences.

It should be noted that the foregoing apparatus embodiment may be alternatively implemented by using a software and hardware platform that includes a processor, a transmitter, and a receiver, and may further include a component such as a memory, or may be implemented by using a software platform.

It should be noted that, optionally, in all embodiments of the present disclosure, a beam may be a transmit beam or a receive beam. The transmit beam may be indicated by at least one piece of the following information or a combination thereof: an identifier, an index, a port, and a resource. Different beams may correspond to different resources, but may correspond to a same port. The receive beam may be indicated by at least one piece of the following information or a combination thereof: an identifier, an index, and a port. The resource herein is a time-frequency-code resource. For example, the receive beam is distinguished by using a receive beam number, and 10 receive beams are distinguished by using numbers 0 to 9. Different beams are distinguished by using a receive port number, and 10 receive beams are distinguished by using receive port numbers 0 to 9. Alternatively, port numbers 0, 1; 0, 1; 0, 1 . . . separately correspond to a plurality of receive beams. In this case, two beams are simultaneously received, and a plurality of groups of beams are distinguished in a time division manner, for example, using different slots slot for distinguishing.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk used by the present disclosure include a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. An uplink access method, comprising:
   receiving, by user equipment, N signals and N pieces of physical random access channel (PRACH) resource indication information, wherein N is an integer greater than or equal to 2, and wherein an $i^{th}$ piece of PRACH resource indication information is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N; and
   selecting, by the user equipment, a PRACH resource, and sending a random access preamble sequence by using the PRACH resource.

2. The method according to claim 1, wherein an $i^{th}$ signal and an $i^{th}$ piece of PRACH resource indication information are carried in a transmit beam of a base station, and i is an integer that is greater than or equal to 1 and less than or equal to N.

3. The method according to claim 1, wherein an $i^{th}$ piece of PRACH resource indication information is carried in another channel indicated by channel indication information that is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N.

4. The method according to claim 1, wherein each of the N signals is a reference signal or a synchronization signal.

5. The method according to claim 1, wherein the PRACH resource indication information is used to indicate at least two PRACH resources.

6. The method according to claim 5, wherein the PRACH resource indication information comprises identifiers of the at least two PRACH resources.

7. The method according to claim 5, wherein the PRACH resource indication information comprises at least one piece of the following indication information of the at least two PRACH resources: time domain resource indication information, frequency domain resource indication information, and code domain resource indication information.

8. A base station, comprising:
a transmitter and a receiver wherein
the transmitter is configured to send N signals and N pieces of physical random access channel (PRACH) resource indication information, wherein N is an integer greater than or equal to 2, and wherein an $i^{th}$ piece of PRACH resource indication information is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N; and
the receiver is configured to receive a random access preamble sequence of a user equipment on PRACH resources indicated by the N pieces of PRACH resource indication information.

9. The base station according to claim 8, wherein an is signal and an $i^{th}$ piece of PRACH resource indication information are carried in a transmit beam of the transmitter, and i is an integer that is greater than or equal to I and less than or equal to N.

10. A user equipment apparatus, comprising:
a receiver and a transmitter, wherein
the receiver is configured to receive N signals and N pieces of physical random access channel (PRACH) resource indication information, wherein M is an integer greater than or equal to 2, and wherein an $i^{th}$ piece of PRACH resource indication information is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N;

the processor is configured to select a PRACH resource; and
the transmitter is configured to send a random access preamble sequence by using the PRACH resource.

11. The user equipment apparatus according to claim 10, wherein an $i^{th}$ signal and an $i^{th}$ piece of PRACH resource indication information are carried in a transmit beam of a base station, and i is an integer that is greater than or equal to 1 and less than or equal to N.

12. The user equipment apparatus according to claim 10, wherein an $i^{th}$ piece of PRACH resource indication information is carried in another channel indicated by channel indication information that is carried in an $i^{th}$ channel, a time-frequency-code resource used by an $i^{th}$ signal has a preset relationship with a time-frequency-code resource used by the $i^{th}$ channel, and i is an integer that is greater than or equal to 1 and less than or equal to N.

13. The user equipment apparatus according to claim 10, wherein the M signals are reference signals or synchronization signals.

14. The user equipment apparatus according to claim 10, wherein the PRACH resource indication information is used to indicate at least two PRACH resources.

15. The user equipment apparatus according to claim 14, wherein the PRACH resource indication information comprises identifiers of the at least two PRACH resources.

16. The user equipment apparatus according to claim 14, wherein the PRACH resource indication information comprises at least one piece of the following indication information of the at least two PRACH resources: time domain resource indication information, frequency domain resource indication information, and code domain resource indication information.

* * * * *

UNITED STATES PATENT AND TRADEMARK OFFICE
CERTIFICATE OF CORRECTION

PATENT NO. : 11,057,941 B2
APPLICATION NO. : 16/402438
DATED : July 6, 2021
INVENTOR(S) : Yi Qin et al.

It is certified that error appears in the above-identified patent and that said Letters Patent is hereby corrected as shown below:

In the Claims

In Claim 9, Column 19, Line 20, remove "wherein an is" and insert --wherein an $i^{th}$--.

In Claim 9, Column 19, Line 23, remove "equal to I and" and insert --equal to 1 and--.

In Claim 10, Column 19, Line 26, remove "a receiver and a transmitter" and insert --a receiver, a processor, and a transmitter--.

In Claim 13, Column 20, Line 20, remove "wherein the M signals" and insert --wherein the N signals--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*